(12) United States Patent
Mahdavi et al.

(10) Patent No.: US 8,793,390 B2
(45) Date of Patent: Jul. 29, 2014

(54) SYSTEMS AND METHODS FOR PROTOCOL DETECTION IN A PROXY

(75) Inventors: Jamshid Mahdavi, San Jose, CA (US); Ron Frederick, Mountain View, CA (US); Srinath Joshi, Santa Clara, CA (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 1110 days.

(21) Appl. No.: 11/419,953

(22) Filed: May 23, 2006

(65) Prior Publication Data

US 2007/0276931 A1  Nov. 29, 2007

(51) Int. Cl.
*G06F 15/16* (2006.01)
*H04L 9/32* (2006.01)

(52) U.S. Cl.
USPC .......................................... 709/230; 713/176

(58) Field of Classification Search
USPC ....................................................... 709/230
See application file for complete search history.

(56) References Cited

U.S. PATENT DOCUMENTS

| | | | | |
|---|---|---|---|---|
| 5,754,552 | A * | 5/1998 | Allmond et al. | 370/465 |
| 6,046,980 | A | 4/2000 | Packer | |
| 6,285,658 | B1 | 9/2001 | Packer | |
| 6,363,479 | B1 * | 3/2002 | Godfrey et al. | 713/160 |
| 6,412,000 | B1 | 6/2002 | Riddle et al. | |
| 6,457,051 | B1 | 9/2002 | Riddle et al. | |
| 6,504,851 | B1 * | 1/2003 | Abler et al. | 370/466 |
| 6,505,241 | B2 * | 1/2003 | Pitts | 709/218 |
| 6,591,299 | B2 | 7/2003 | Riddle et al. | |
| 6,654,383 | B2 * | 11/2003 | Haymes et al. | 370/466 |
| 6,678,751 | B1 * | 1/2004 | Hays et al. | 710/8 |
| 6,920,503 | B1 * | 7/2005 | Nanji et al. | 709/230 |
| 7,032,072 | B1 | 4/2006 | Quinn et al. | |
| 7,155,502 | B1 | 12/2006 | Galloway et al. | |
| 7,197,049 | B2 * | 3/2007 | Engstrom et al. | 370/469 |
| 7,203,169 | B1 | 4/2007 | Okholm et al. | |
| 7,292,531 | B1 | 11/2007 | Hill | |
| 7,296,288 | B1 | 11/2007 | Hill et al. | |
| 7,324,447 | B1 | 1/2008 | Morford | |
| 7,359,984 | B1 | 4/2008 | Hackney | |
| 7,376,080 | B1 | 5/2008 | Riddle et al. | |
| 7,385,924 | B1 | 6/2008 | Riddle | |

(Continued)

FOREIGN PATENT DOCUMENTS

| | | |
|---|---|---|
| WO | 98/26510 A2 | 6/1998 |
| WO | 98/26510 A3 | 10/1998 |
| WO | 99/27684 A1 | 6/1999 |

OTHER PUBLICATIONS

Dubrawsky, Ido, Firewall Evolution—Deep Packet Inspection; Jul. 29, 2003; http://www.securityfocus.com/infocus/1716; 9pp.

(Continued)

*Primary Examiner* — Brian P Whipple
*Assistant Examiner* — James Edwards
(74) *Attorney, Agent, or Firm* — Ascenda Law Group, PC

(57) ABSTRACT

Systems, methods, and computer products for detecting protocols in a network proxy are provided. Protocol detection includes receiving from a first computer a request for connection to a second computer, the request conforming to a first protocol; establishing a connection with at least one of the first computer and the second computer; receiving data from at least one of the first computer and the second computer, wherein the data conforms to a second protocol; and performing protocol detection on the data.

15 Claims, 8 Drawing Sheets

(56) References Cited

U.S. PATENT DOCUMENTS

| | | | |
|---|---|---|---|
| 7,433,304 B1 | 10/2008 | Galloway et al. | |
| 7,457,870 B1 | 11/2008 | Lownsbrough et al. | |
| 7,460,534 B1* | 12/2008 | Bellenger | 370/392 |
| 7,463,590 B2* | 12/2008 | Mualem et al. | 370/241 |
| 7,493,659 B1* | 2/2009 | Wu et al. | 726/26 |
| 7,522,530 B2* | 4/2009 | Fdida et al. | 370/241 |
| 7,543,052 B1 | 6/2009 | Cesa Klein | |
| 7,545,748 B1 | 6/2009 | Riddle | |
| 7,554,983 B1 | 6/2009 | Muppala | |
| 7,580,356 B1 | 8/2009 | Mishra et al. | |
| 7,610,330 B1 | 10/2009 | Quinn et al. | |
| 2002/0055998 A1 | 5/2002 | Riddle et al. | |
| 2002/0143939 A1 | 10/2002 | Riddle et al. | |
| 2002/0161895 A1* | 10/2002 | Appiah et al. | 709/227 |
| 2003/0018974 A1* | 1/2003 | Suga | 725/86 |
| 2003/0084326 A1* | 5/2003 | Tarquini | 713/200 |
| 2003/0145226 A1* | 7/2003 | Bruton et al. | 713/201 |
| 2003/0154399 A1* | 8/2003 | Zuk et al. | 713/201 |
| 2003/0225900 A1* | 12/2003 | Morishige et al. | 709/230 |
| 2004/0006706 A1* | 1/2004 | Erlingsson | 713/200 |
| 2004/0088423 A1* | 5/2004 | Miller et al. | 709/229 |
| 2004/0098641 A1* | 5/2004 | Sirbu | 714/43 |
| 2004/0111623 A1* | 6/2004 | Miller et al. | 713/182 |
| 2004/0136386 A1* | 7/2004 | Miller et al. | 370/401 |
| 2005/0004975 A1* | 1/2005 | Prasad | 709/203 |
| 2005/0018618 A1* | 1/2005 | Mualem et al. | 370/252 |
| 2006/0026269 A1* | 2/2006 | Sadovsky et al. | 709/222 |
| 2006/0026270 A1* | 2/2006 | Sadovsky et al. | 709/222 |
| 2006/0095968 A1* | 5/2006 | Portolani et al. | 726/23 |
| 2006/0106583 A1* | 5/2006 | Fdida et al. | 702/189 |
| 2007/0088981 A1* | 4/2007 | Noble et al. | 714/26 |
| 2007/0121596 A1* | 5/2007 | Kurapati et al. | 370/356 |
| 2007/0124577 A1* | 5/2007 | Nielsen et al. | 713/151 |
| 2007/0204089 A1* | 8/2007 | Proctor | 710/301 |
| 2008/0061961 A1* | 3/2008 | John | 340/539.12 |
| 2008/0075103 A1* | 3/2008 | Noble et al. | 370/429 |

OTHER PUBLICATIONS

Informit; Stateful Firewalls; Feb. 21, 2005; http://www.informit.com/articles/printerfriendly.aspx?p=373120; 20pp.

Wikipedia; http://web.archive.org/web/20051215000000/http://en.wikipedia.org/wiki/Stateful_firewall; Dec. 15, 2005, 2 pp.

Sen, Subhabrata; Spatscheck, Oliver; Wang, Dongmei; Accurate, Scalable In-Network Identification of P2P Traffic Using Application Signatures; WWW2004, May 17-22, 2004; New York, New York; pp. 512-521.

* cited by examiner

SYSTEMS AND METHODS FOR PROTOCOL DETECTION IN A PROXY

FIELD OF THE INVENTION

The present invention relates generally to computer network protocol detection, and more particularly to methods and systems for detecting computer network protocols at a proxy deployed in a communication path between a client and a server.

BACKGROUND

Studies indicate that as much as 60% of broadband ISP bandwidth is being consumed by Peer-To-Peer (P2P) file sharing technologies. Although some P2P technologies can have legitimate uses in enterprises, unmanaged use of P2P file sharing services exposes corporations to serious business risks, including loss of confidential information, viruses, worms, spyware, and copyright violations. With P2P file sharing services, employees have the ability to easily circumvent corporate security measures that are primarily intended to protect the network perimeter from external security threats. This ability is due to the fact that P2P clients are freely downloadable and are specifically designed to evade network security by employing techniques such as port scanning, tunneling, and encryption. Since P2P file sharing is port-agnostic, blocking it at the firewall becomes extremely difficult. Also, since P2P file sharing protocols are not standards-based, they are extremely difficult for network administrators to control, or even detect.

Conventional methods for P2P protocol detection operate on a packet-by-packet basis (or "stateful firewall"), and thus do not act at layer 7 (the so-called application layer). For example, see Sen, Subhabrata et al. "Accurate, Scalable In-Network Identification of P2P Traffic Using Application Signatures." *WWW '04: Proceedings of the 13th international conference on World Wide Web* pp. 512-521 (2004). These methods do not provide the ability to terminate connections. Moreover, proxy servers in a corporate intranet may see more unwanted traffic than just P2P traffic. For example, HTTP or HTTPS traffic might occur on non-standard ports. Also, non-standard protocols might be used on well-known ports, such as instant messaging traffic trying to connect out on port 443 hoping that a firewall would allow the traffic thinking that it was HTTPS. The conventional protocol detection methods are not particularly suited for proxy servers in a corporate intranet.

Accordingly, there is a need in the art to control "rogue" network traffic, to correctly identify enterprise applications, and to provide support for other port-agnostic application protocols as they become popular.

Accordingly, there is a need in the art to control "rogue" network traffic, to correctly identify enterprise applications, and to provide support for other port-agnostic application protocols as they become popular.

SUMMARY OF THE INVENTION

Systems, methods, and computer products consistent with embodiments of the present invention are directed to detecting protocols in a network proxy. One embodiment consistent with the present invention includes receiving from a first computer a request for connection to a second computer, the request conforming to a first protocol; establishing a connection with at least one of the first computer and the second computer; receiving data from at least one of the first computer and the second computer, wherein the data conforms to a second protocol; and performing protocol detection on the data. The connection may be assigned to the correct application proxy for processing corresponding to the second protocol. Performing protocol detection may include comparing the data to protocol signatures. A connection may be established with both the first computer and the second computer before receiving data. A connection may be established with the first computer before establishing a connection with the second computer, or a connection request may be forwarded to the second computer and the connection established after receiving a reply from the second computer.

In a further embodiment consistent with the present invention, the first computer may be protected by a firewall and the second computer may be outside of the firewall. In another embodiment, the first computer may be outside of the firewall and the second computer may be protected by the firewall. Of course, the presence or absence of a firewall is not critical to the present invention and in some instances both or neither of the computers may be behind firewalls. Protocol detection may occur at an application layer of a protocol stack. Further, the connection may be handled in accordance with a predetermined policy. That policy may be one of allowing the connection, terminating the connection, allowing the connection to be subject to protocol optimization, and allowing the connection subject to a bandwidth limitation, bandwidth prioritization or bandwidth optimization.

Other systems, methods, features, and advantages of the invention will become apparent upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

Figure 1:
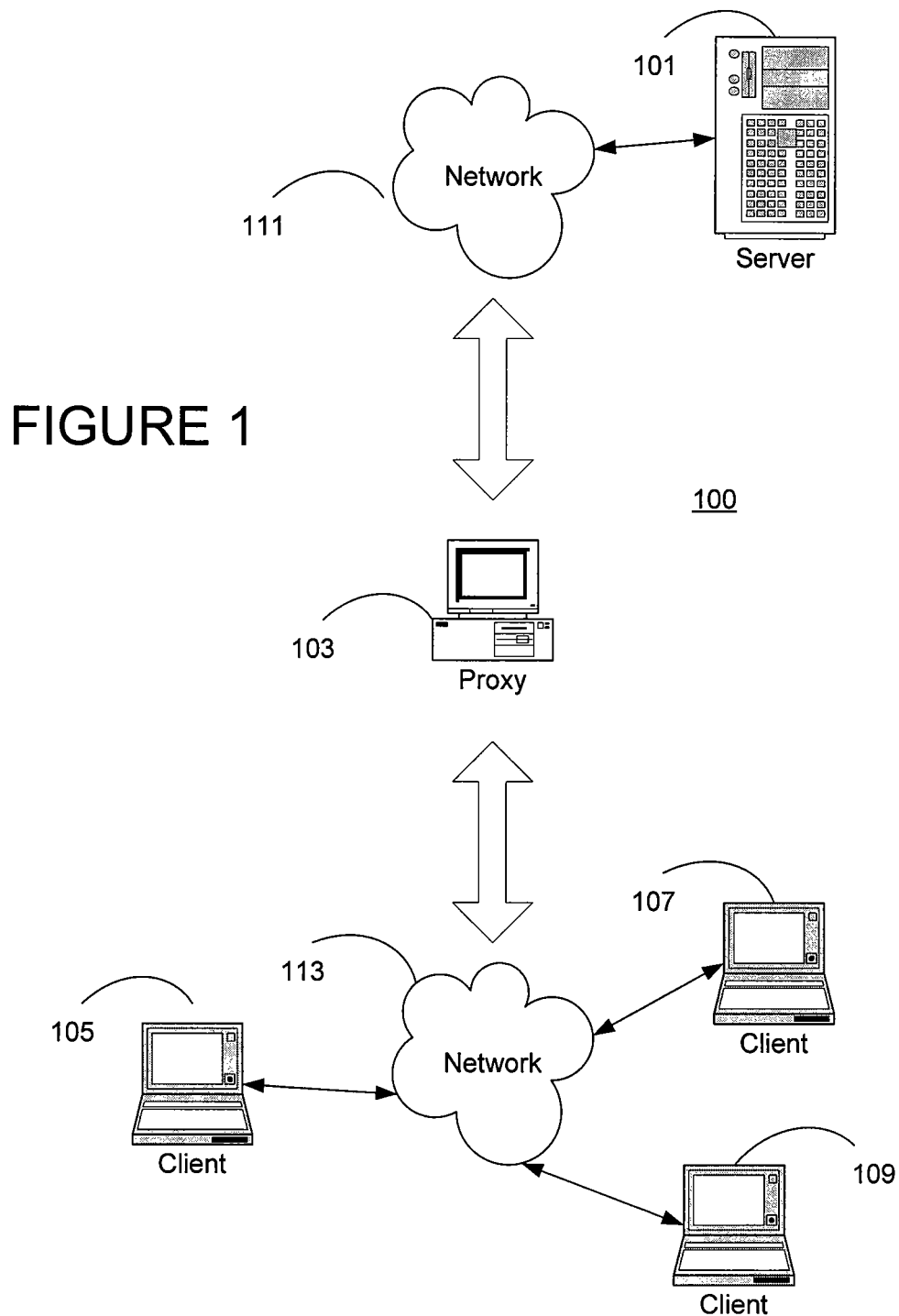
FIG. 1 illustrates a network environment.

Described herein are methods and systems for detecting communication protocols in proxy servers and the like. Throughout this discussion reference will be made in detail to an implementation consistent with the present invention as illustrated in the accompanying drawings. Wherever possible, the same reference numbers will be used throughout the drawings and the following description to refer to the same or like parts. It should be remembered, however, that this description is not meant to limit the scope of the present invention. Instead, the illustrated embodiments described below are being presented by way of example to better explain the nature and operation of the present invention. The scope of the invention should only be measured in terms of the claims following this description.

Various embodiments of the present invention may be implemented with the aid of computer-implemented processes or methods (a.k.a. programs or routines) that may be rendered in any computer language including, without limitation, C#, C/C++, Fortran, COBOL, PASCAL, assembly language, markup languages (e.g., HTML, SGML, XML, VOXML), and the like; scripting languages such as Perl, Javascript, Python, and the like; as well as object-oriented environments such as the Common Object Request Broker Architecture (CORBA), Java™ and the like. In general, however, all of the aforementioned terms as used herein are meant to encompass any series of logical steps performed in a sequence to accomplish a given purpose.

In view of the above, it should be appreciated that some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented with an apparatus to perform the operations described herein. This apparatus may be specially constructed for the required purposes, or it may comprise a general-purpose computer, selectively activated or reconfigured by a computer program stored in the computer. It should be noted, however, that the algorithms and processes presented herein are not inherently related to any particular computer or other apparatus.

Further, portions of the following description make reference to various protocol stack "layers". These terms are used in the context of the Open Systems Interconnect (OSI) model in which:

a. Application—Layer 7: This top layer defines the language and syntax that application programs use to communicate with like programs. The application layer represents the purpose of communicating in the first place.

b. Presentation—Layer 6: When data is transmitted between different types of computer systems, the presentation layer negotiates and manages the way data is represented and encoded. This layer may also be used for encryption and decryption.

c. Session—Layer 5: Provides coordination of the communications in an orderly manner. It determines one-way or two-way communications and manages the dialogue between both parties. In practice, services within this layer are often incorporated into the transport layer.

d. Transport—Layer 4: The transport layer is responsible for overall end-to-end validity and integrity of the transmission. Stated simply, this layer ensures that if a 12 MB file is sent, the full 12 MB is received.

e. Network—Layer 3: The network layer establishes the route between the sending and receiving stations. This layer is the switching function of routable protocols such as the Internet protocol (IP).

f. Data Link—Layer 2: The data link is responsible for node-to-node validity and integrity of the transmission.

g. Physical—Layer 1: The physical layer is responsible for passing bits onto and receiving them from the actual connecting medium.

Turning now to FIG. 1, a communication system 100 in which a protocol detector consistent with the present invention operates is illustrated. The protocol detector may be installed in proxy 103 that is communicatively connected to client computers 105, 107, and 109 via a first network 113, e.g., an intranet. Proxy 103 intercepts communication between client computers 105, 107, and 109, and a second network 111, e.g., the Internet, of which server 101 may be a part or be communicatively coupled thereto. Thus, if server 101 attempts communication with any of client computers 105, 107, and 109, that communication must go through proxy 103. Likewise, if any of client computers 105, 107, and 109 attempts communication outside of first network 113, that communication must also go through proxy 103. In an alternative embodiment consistent with the present invention, a server is located within or communicatively coupled to the first network, and a client in or communicatively coupled to the second network attempts communication with the server through the proxy. In another embodiment, the first network 113 and the second network 111 may simply be different sections of a single enterprise network or ISP network.

It is also the case that the interception referred to above may be accomplished in any of a number of ways. The diagram illustrates a so-called "in-line" interception method, where the proxy might be acting as a bridge (at layer 2) or a router (at layer 3). However, the proxy may also be used "out of line", and used as an explicit proxy by clients. The identity of the explicit proxy may be configured at each client, or it may be automatically discovered via methods such as Web Proxy Auto-Discovery (WPAD), which uses DNS or DHCP. Further, the proxy may be automatically discovered using on-demand SOCKS client technology as provided by the assignee of the present invention. Finally, the proxy may be configured as a "virtually in-line" proxy, where some or all packets are forwarded to the proxy based on policy instructions stored at a router, switch or layer 4 switch, or based on the Web Cache Communication Protocol (WCCP). The protocol detection methods described herein may be employed in connection with any of these configurations, or any similar configurations.

Figure 2:
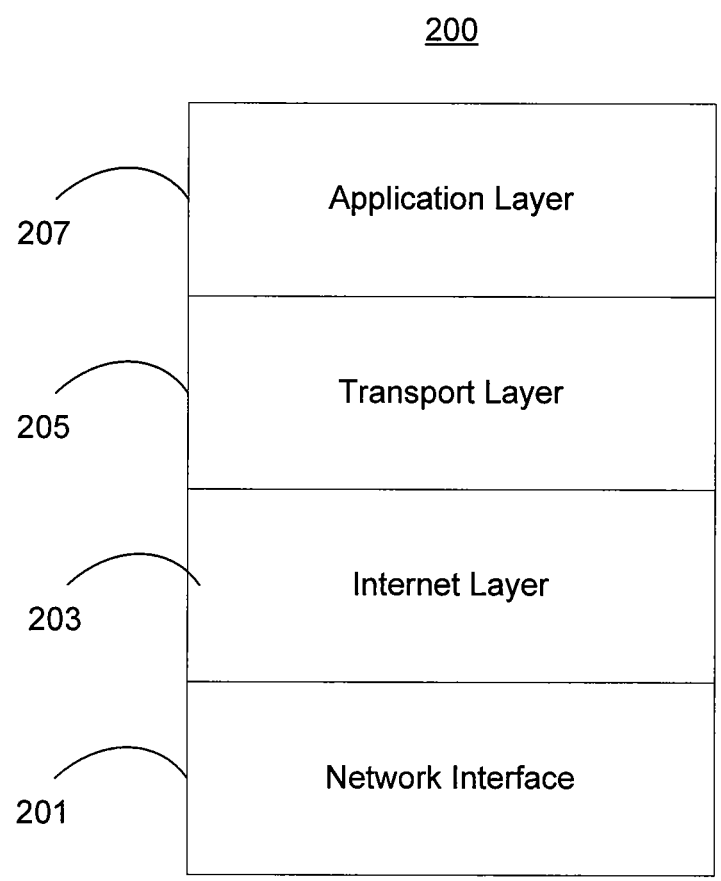
FIG. 2 illustrates a protocol stack.

FIG. 2 shows a block diagram of a layered communication protocol stack utilized in the system of FIG. 1. The server 101, proxy 103, and client computers 105, 107, and 109 employ, according to one embodiment consistent with the present invention, a layered protocol stack 200 that includes at least a network interface layer 201, an Internet layer 203, a transport layer 205, and an application layer 207. The proxy 103 operates at the application layer 207 by receiving application-level communications from both the server 101 and the clients 105, 107, and 109. Application level protocols include, for example, the Hypertext Transfer Protocol (HTTP), the Simple Mail Transfer Protocol (SMTP), the File Transfer Protocol (FTP), and various Peer-To-Peer (P2P) protocols. The Internet layer 203 may include the Internet Protocol (IP) version 4 or 6, for example. The transport layer 205 may include the TCP (Transmission Control Protocol) and the UDP (User Datagram Protocol). The network interface layer 201 provides a physical interface to the first and second networks 113 and 111.

Figure 3:
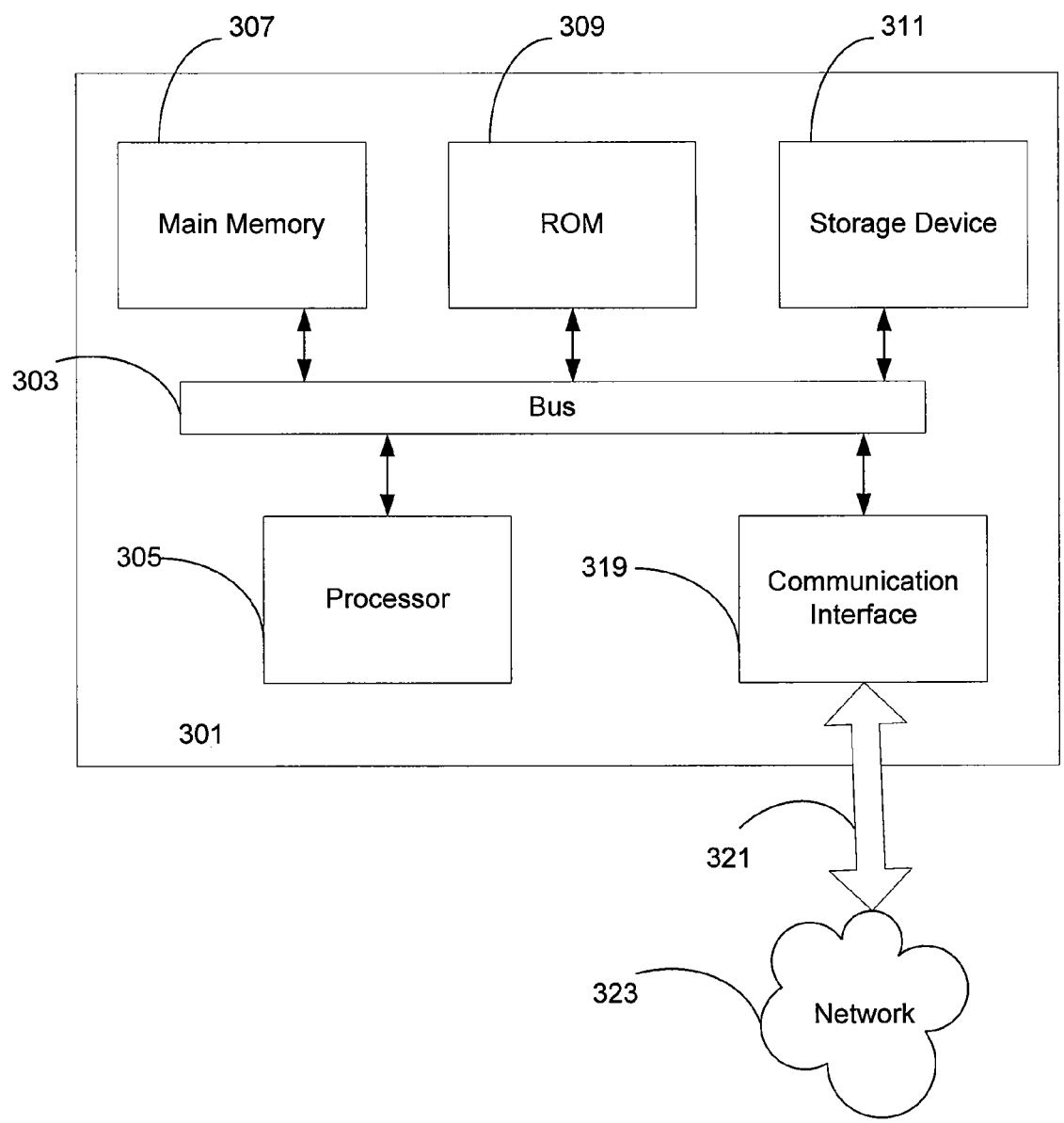
FIG. 3 illustrates a conventional computer system.

FIG. 3 is a diagram of a computer system that can be configured as a proxy consistent with an embodiment of the present invention. Computer system 301 includes a bus 303 or other communication mechanism for communicating information, and a processor 305 coupled with bus 303 and configured for processing the information. Computer system 301 also includes a main memory 307, such as a random access memory (RAM) or other dynamic storage device, coupled to bus 303 and configured for storing information and instructions to be executed by processor 305. In addition, main memory 307 may be used for storing temporary variables or other intermediate information during execution of instructions to be executed by processor 305. Computer system 301 further includes a read only memory (ROM) 309 or other static storage device coupled to bus 303 and configured for storing static information and instructions for processor 305. A storage device 311, such as a magnetic disk or optical disk, is also coupled to bus 303 and configured for storing computer-readable information and instructions.

According to one embodiment of the present invention, interaction within system 100 is provided by computer system 301 in response to processor 305 executing one or more sequences of one or more instructions contained in main memory 307. Such instructions may be read into main memory 307 from another computer-readable medium, such as storage device 311 and/or ROM 309. Execution of the sequences of instructions contained in main memory 307 causes processor 305 to perform the process steps described herein. One or more processors in a multi-processing arrangement may also be employed to execute the sequences of instructions contained in main memory 307. In alternative embodiments, hard-wired circuitry may be used in place of or in combination with software instructions. Thus, embodiments are not limited to any specific combination of hardware circuitry and software.

Further, the instructions to support the system interfaces and protocols of system 100 may reside on a computer-readable medium. The term "computer-readable medium" as used herein refers to any medium that participates in providing instructions to processor 305 for execution. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, or any other medium from which a computer can read.

Computer system 301 also includes one or more communication interfaces 319 coupled to bus 303. Communication interface 319 provides a two-way data communication coupling to a network link 321 that is connected to a local network 323. For example, communication interface 319 may be a network interface card. As another example, communication interface 319 may be an asymmetrical digital subscriber line (ADSL) card, an integrated services digital network (ISDN) card or a modem to provide a data communication connection to a corresponding type of telephone line. Wireless communication links may also be implemented. In any such implementation, communication interface 319 sends and receives electrical, electromagnetic or optical signals that carry digital data streams representing various types of information.

Figure 4:
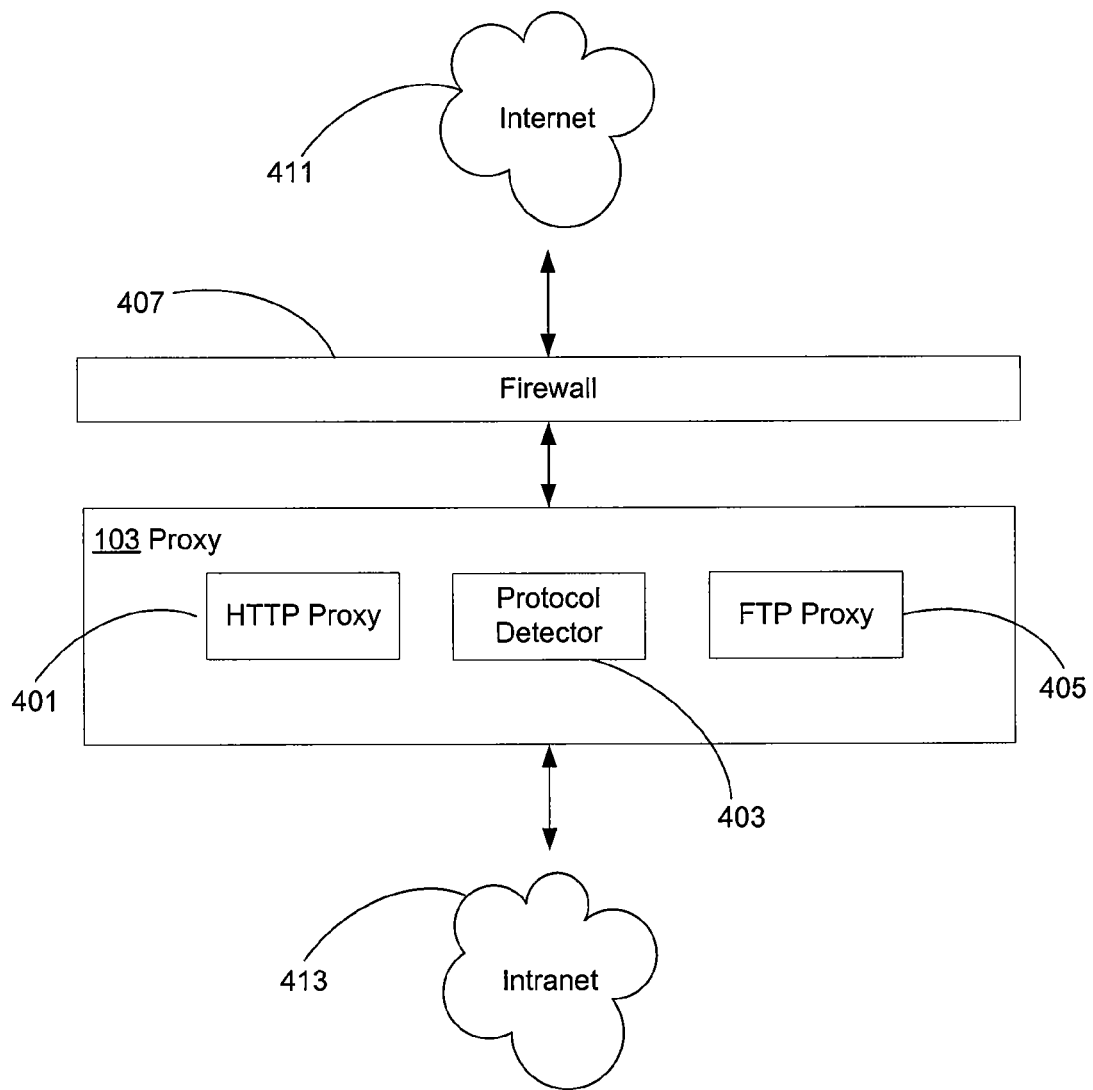
FIG. 4 illustrates components of a proxy consistent with an embodiment of the present invention.

In accordance with one embodiment consistent with the present invention, FIG. 4 illustrates proxy 103 configured with one or more of an HTTP application proxy service 401, a protocol detector service 403, and an FTP application proxy service 405. The proxy 103 is logically located between an intranet 413 and firewall 407, which is connected to the Internet 411. Each application proxy service typically owns one or more service ports, can intercept inbound and outbound connections in explicit or transparent modes, and can provide granular control of that traffic through the use of policy rules. The protocol detector service 403 listens to traffic being tunneled inside application protocols such as HTTP and SOCKS and also to traffic on other non-owned TCP ports via the creation of a "TCP tunnel" proxy service. The protocol detector 403 performs protocol detection to determine the communication protocol, such as a P2P protocol, of the traffic that is piggy-backed within these tunnels or on these non-owned ports. Upon successful recognition, the protocol detector service 403 will handoff the client connection to the respective application proxy corresponding to the detected protocol. The protocol detector service will handle connections that failed protocol recognition in accordance with predetermined policies.

Figure 5:
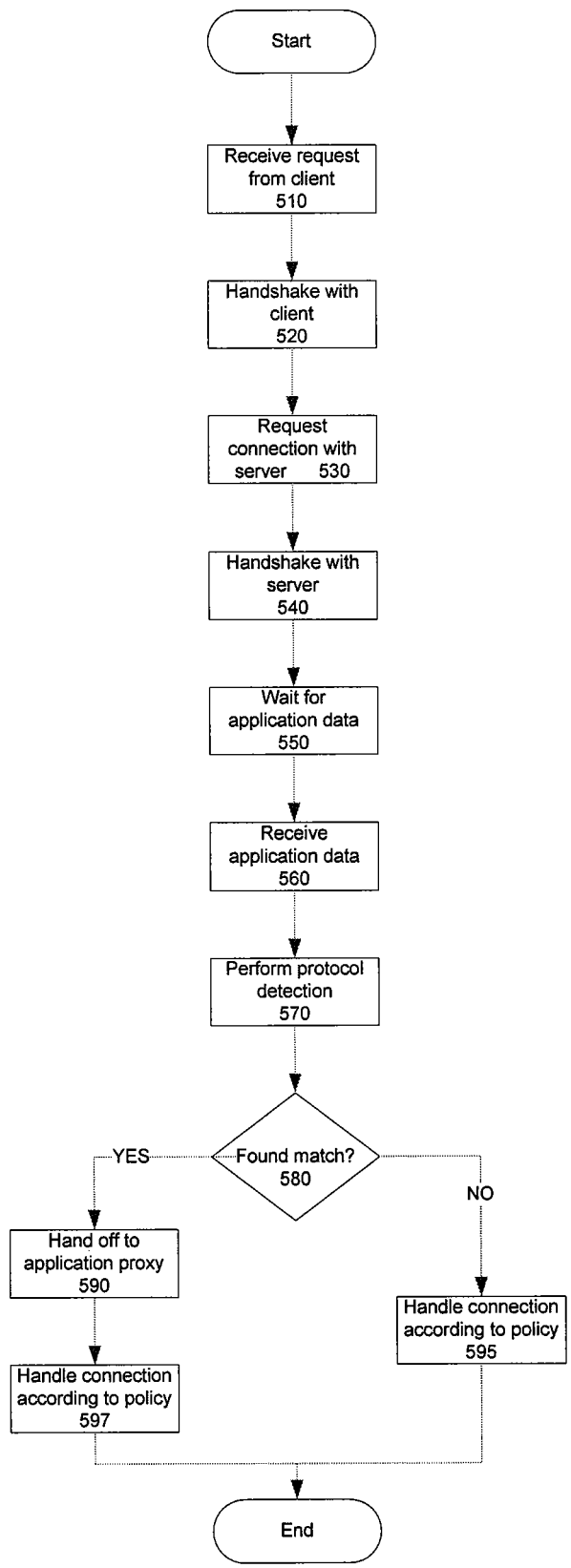
FIG. 5 is a flow diagram illustrating a protocol detection process consistent with an embodiment of the present invention where a connection is established immediately.

FIG. 5 illustrates a method for protocol detection consistent with an embodiment of the present invention. The proxy receives an outbound connection request from a client to a server through the intranet at step 510. For example, the connection request may be a TCP connection message. At step 520, the proxy accepts the connection from the client by performing a connection establishment routine. Where the connection is a TCP connection, for example, the connection establishment routine may be a three-way TCP handshake. The proxy then requests a connection to the server on the client's behalf at step 530. At step 540, the proxy completes the connection, for example a TCP connection, by completing the three-way handshake with the server. At step 550, the proxy waits to receive application data from either the client or the server. A protocol detector service on the proxy receives application data from at least one of the client and the server at step 560.

At step 570 the protocol detector service performs protocol detection. In one embodiment consistent with the present invention, protocol detection is implemented by comparing the received application data to a set of predetermined protocol signatures. Note that one set of signatures may be employed when the proxy is analyzing data from the client and a wholly or partially different set of signatures may be used when the proxy is analyzing data from the server. Of course, in some cases, a single unified set of signatures may be employed.

If the application data is substantially similar to the protocol signature, the protocol detector may determine that the application data was sent according to the protocol corresponding to the matching protocol signature. In one embodiment consistent with the present invention, protocol comparison for each of the known protocol signatures is performed by state machines operating in parallel. The outcome of the comparison is one of match, no match, and undetermined.

At step 580, the protocol detector service determines whether a match has been found. If a match was found, the protocol detector service hands off the connection to the application proxy service corresponding to that protocol at step 590 and the application proxy handles the connection based on a predetermined policy at step 597. If no match was found, the proxy detector service handles the connection based on a predetermined policy at step 595. In one embodiment consistent with the present invention, the above-described policies may be any of allowing the connection, terminating the connection, allowing the connection to be subject to protocol optimization, or allowing the connection subject to bandwidth restrictions, bandwidth prioritization or bandwidth optimization.

In an alternative embodiment consistent with the present invention, the protocol detection service is invoked immediately after step 520, and protocol detection is performed only on data received from the client before a connection is initiated with the server.

Figure 6:
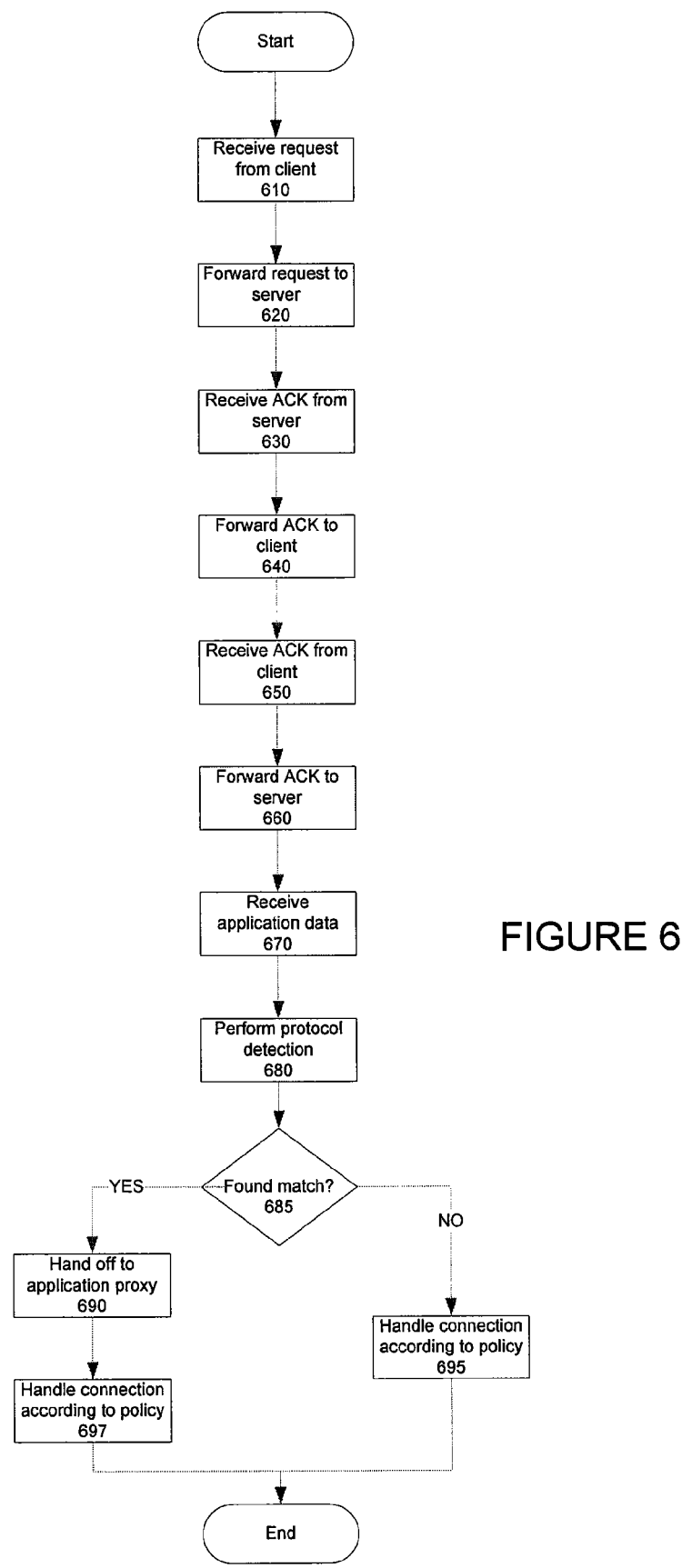
FIG. 6 is a flow diagram illustrating a further protocol detection process consistent with an embodiment of the present invention where connection establishment is delayed.

FIG. 5 is directed to an embodiment consistent with the present invention in which the connection with the requesting computer is established immediately. FIG. 6, however, illustrates an embodiment consistent with the present invention in which the proxy waits until a reply has been received from the second computer before establishing a connection with the first computer. At step 610, a connection request from a client to a server is received at the proxy. The proxy, without completing a three-way handshake with the client, forwards the connection request, for example a SYN packet (possibly with modifications, e.g., to the IP and/or TCP fields for example), to the server on behalf of the client at step 620. At step 630 the proxy receives an acknowledgement from the server, for example a SYN ACK packet, indicating that the server will accept the connection. The proxy then forwards (again, potentially with modifications) the SYN ACK to the client on behalf of the server at step 640. The proxy then receives an ACK from the client at step 650, and forwards (possibly with modifications) the ACK to the server on behalf of the client at step 660. At step 670, the proxy receives application data from at least one of the client and the server and initiates the protocol detector service. At step 680 the protocol detector service performs protocol detection as previously described.

At step 685, the protocol detector service determines whether a match has been found. If a match was found, the protocol detector service hands off the connection to the application proxy service corresponding to that protocol at step 690 and the application proxy service handles the connection based on a predetermined policy at step 697. If no match was found, the proxy detector service handles the connection based on a predetermined policy at step 695. In one embodiment consistent with the present invention, the above-described policies may be any of allowing the connection, terminating the connection, allowing the connection to be subject to protocol optimization, or allowing the connection subject to bandwidth restrictions, bandwidth prioritization or bandwidth optimization.

FIGS. 5 and 6 are directed to embodiments consistent with the present invention in which the client is behind a firewall. In alternative embodiments consistent with the present invention, the server may be behind a firewall and the client is outside same. Alternatively, or in addition, both the server and client may be behind respective firewalls or neither may be behind a firewall.

Figure 7:
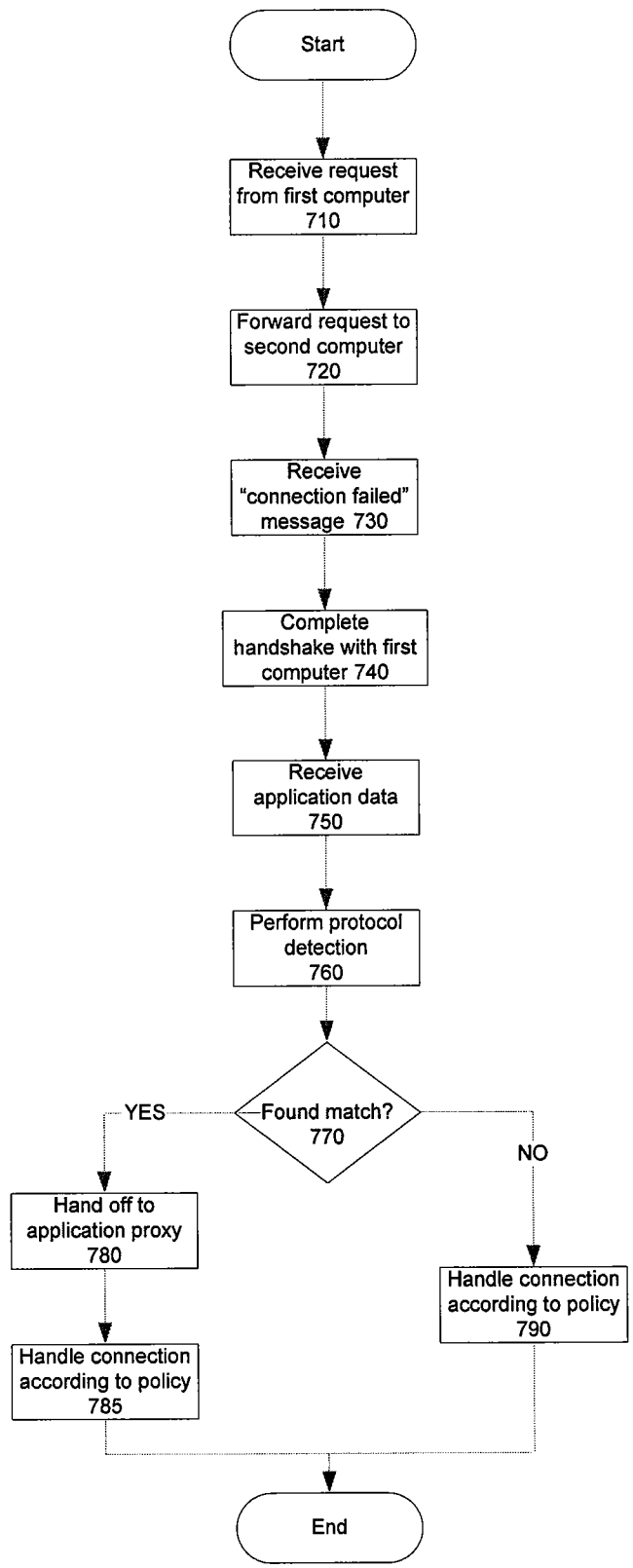
FIG. 7 is a flow diagram illustrating still another protocol detection process consistent with an embodiment of the present invention where a firewall blocks connection with an intended recipient computer of a connection request.

FIG. 7 describes an embodiment consistent with the present invention where either the server or the client cannot be reached through a firewall. At step 710, a connection request from a first computer (e.g., a client or server) to a second computer (e.g., a server or client, respectively) is received at the proxy. The proxy attempts a connection with the second computer at step 720. At step 730 the proxy receives an indication that a connection with the second computer is not allowed by a firewall. At step 740, the proxy waits to receive application data only from the first computer, since the second computer cannot be reached. At step 750 the proxy receives application data from the first computer and initiates the protocol detector service. At step 760 the protocol detector service performs protocol detection as previously described. At step 770, the protocol detector service determines whether a match has been found. If a match is found, the protocol detector service hands off the connection to the application proxy service corresponding to that protocol at step 780 and the application proxy handles the connection based on a predetermined policy at step 785. If no match is found, the proxy detector service handles the connection based on a predetermined policy at step 790. In one embodiment consistent with the present invention, the above-described policies may be any of allowing the connection, terminating the connection, allowing the connection to be subject to protocol optimization, or allowing the connection subject to bandwidth restrictions, bandwidth prioritization or bandwidth optimization.

Note, the application proxy at step 780 may be capable of handling the request even if the server was unreachable. For example, the application proxy may not require contact with the server to process the request. Or, the application proxy may be able to contact a different server to satisfy the request. Alternatively, the application proxy may make use of a different communication path through the network (potentially via another proxy that is not blocked by the firewall) to reach the server. Also, the predefined policy used at step 785 may specify an alternate server or a suitable alternate path to the server.

In an alternative embodiment consistent with the present invention, protocol detection may be performed multiple times at the proxy. For example, immediately after a connection has been established, and some application data received at the proxy, a "best guess" may be made as to the communication protocol being employed and the connection handed off from the protocol detector service to the corresponding application proxy. Within that application proxy service additional application data may be read in a manner consistent with that application. Afterwards, protocol detection is performed again, taking advantage of this additional information. If the additional information produces a different result, the connection is handed off a second time to a different application protocol proxy consistent with the new result. In some cases, if the true communication protocol cannot be determined in this manner the connection may be suspended or terminated, or it may be handled by an application proxy which is not specific to any particular protocol.

In some cases it may become necessary to establish a new connection with the computer-based entity to which the proxy initiated a connection because of the handoff between the protocol detector and the application proxy (even in the case where only one round of protocol detection was performed), as the initial connection to that device may have been established before any communication protocol was determined. If the application protocol proxy is responsible for implementing a policy which dictates that the proxy should connect to a device in a manner which is different than that in which the original connection was made, the proxy can drop the initial connection received from the protocol detector and initiate a new connection.

Figure 8:
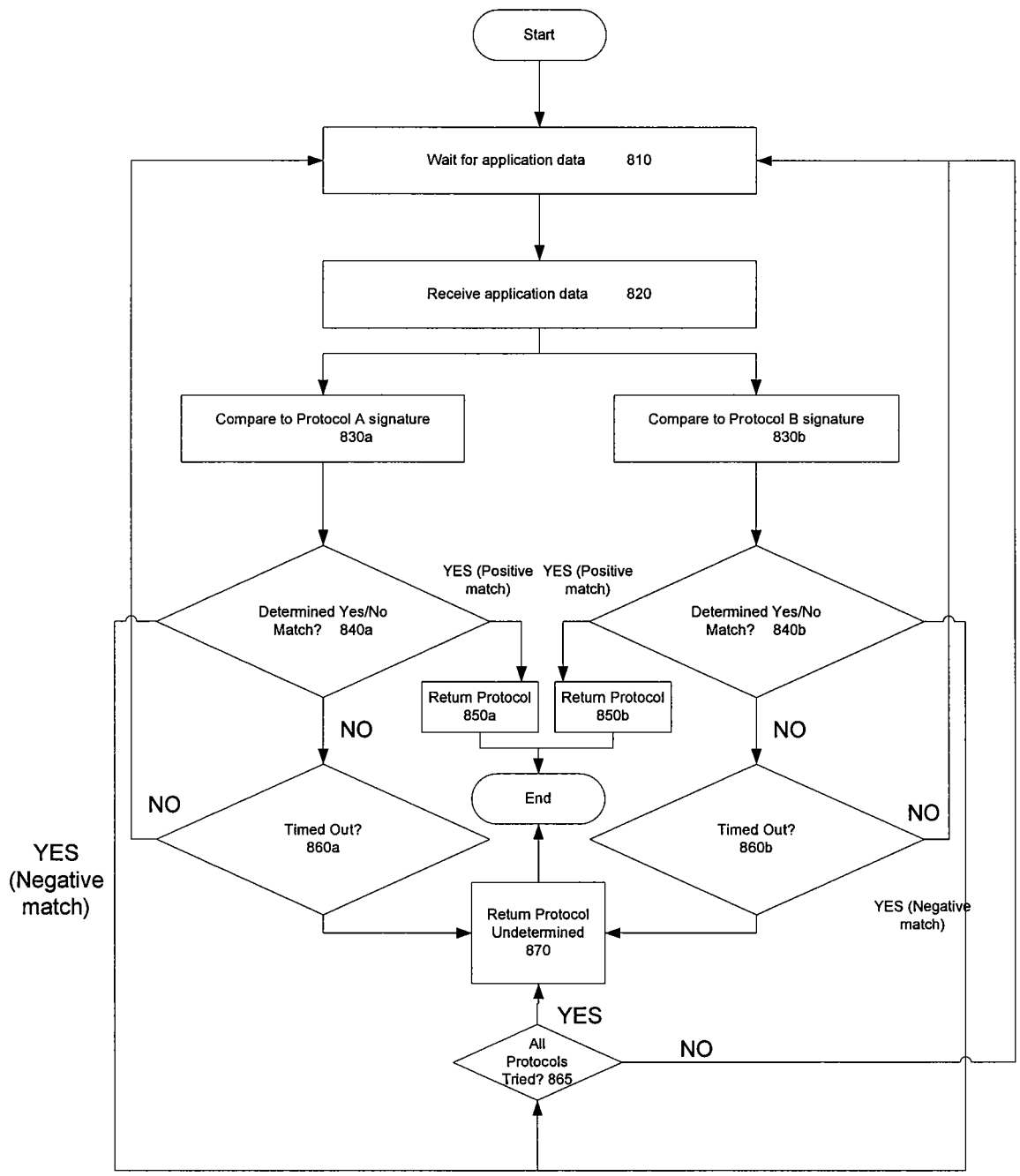
FIG. 8 is a flow diagram illustrating in further detail aspects of a protocol detection process consistent with an embodiment of the present invention.

FIG. 8 illustrates in further detail, aspects of a protocol detection process consistent with embodiments of the present invention. In step 810, a protocol detector waits for application data, and receives application data at step 820. In this example, the application data is compared to a set of protocol signatures, where the protocol signatures correspond to protocols A and B. It may be that the set of known protocol signatures is larger than the set of protocol signatures used in protocol detection. The application data is compared to the protocol A signature and the protocol B signature at steps 830*a* and 830*b*, respectively. At steps 840*a* and 840*b*, the protocol detector determines whether there was a positive or negative match to the respective protocol signature. If a positive match is found, the protocol is returned 850*a*/850*b* and the detection process ends. If there is not yet a positive or negative match, the protocol detector determines whether a session for protocol detection has timed out at steps 860*a* and the 860*b*. If the session has not timed out, the protocol detector returns to step 810 to wait for more data. If the session has timed out, or negative matches for all protocols have been returned 865, the detector returns an indication that the protocol is undetermined 870, and the protocol detection process ends for that protocol.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

What is claimed is:

1. A method for protocol detection in a network proxy, comprising:
    receiving at the network proxy and from a first computer, a request for connection to a second computer, the network proxy including a plurality of application proxies;
    establishing by the network proxy, a connection with at least one of the first computer and the second computer according to a connection establishment routine;
    receiving at the network proxy, application data from at least one of the first computer and the second computer, wherein the application data conforms to an application protocol;
    prior to forwarding the application data between the first and second computers, determining the application protocol by comparing the received application data to protocol signatures and, according to results of the comparison, determining whether or not the application protocol corresponds to any one of the plurality of application proxies in the network proxy;
    if the application protocol, as determined by comparing the received application data to protocol signatures, corresponds to one of the application proxies in the network proxy, then responsively handing off the connection to the one application proxy corresponding to the application protocol; and
    if the application protocol, as determined by comparing the received application data to protocol signatures, does not correspond to any one of the plurality of application proxies in the network proxy, then responsively handling the connection according to a predetermined policy that is one of (i) allowing the connection, (ii) allowing the connection to be subject to protocol optimization, and (iii) allowing the connection subject to at least bandwidth limitation, bandwidth prioritization, or bandwidth optimization,
    wherein a first set of protocol signatures is employed for analyzing application data received from the first computer and a second set of protocol signatures, different from the first set, is employed for analyzing application data received from the second computer.

2. The method of claim 1, wherein the connection is established with both the first computer and the second computer before receiving the application data from at least one of the first and second computers.

3. The method of claim 2, wherein the connection is first established with the first computer.

4. The method of claim 2, wherein the connection request is forwarded to the second computer, and the connection is established after receiving a reply from the second computer.

5. The method of claim 1, wherein the first computer is protected by a firewall and the second computer is outside of the firewall.

6. The method of claim 1, wherein the first computer is outside of a firewall and the second computer is protected by the firewall.

7. The method of claim 1, wherein neither the first computer nor the second computer is protected by a firewall.

8. The method of claim 1, wherein both the first computer and the second computer are protected by respective firewalls.

9. A non-transitory computer-readable storage medium having embodied thereon computer-readable instructions for performing a method for protocol detection in a network proxy, the method comprising:
    receiving at the network proxy and from a first computer, a request for connection to a second computer, the network proxy including a plurality of application proxies;
    establishing by the network proxy, a connection with at least one of the first computer and the second computer according to a connection establishment routine;
    receiving at the network proxy application data from at least one of the first computer and the second computer, wherein the application data conforms to an application protocol; and
    prior to forwarding the application data between the first and second computers, determining the application protocol by comparing the received application data to protocol signatures and, according to results of the comparison, determining whether or not the application protocol corresponds to any one of the plurality of application proxies in the network proxy;
    if the application protocol, as determined by comparing the received application data to protocol signatures, corresponds to one of the application proxies in the network proxy, then responsively handing off the connection to the one application proxy corresponding to the application protocol; and
    if the application protocol, as determined by comparing the received application data to protocol signatures, does not correspond to any one of the plurality of application proxies in the network proxy, then responsively handling the connection according to a predetermined policy that is one of (i) allowing the connection, (ii) allowing the connection to be subject to protocol optimization, and (iii) allowing the connection subject to at least bandwidth limitation, bandwidth prioritization, or bandwidth optimization, wherein a first set of protocol signatures is employed for analyzing application data received from the first computer and a second set of protocol signatures, different from the first set, is employed for analyzing application data received from the second computer.

10. The non-transitory computer-readable storage medium of claim 9, wherein the connection is established with both the first computer and the second computer before receiving the application data from at least one of the first and second computers.

11. The non-transitory computer-readable storage medium of claim 10, wherein the connection is first established with the first computer.

12. The non-transitory computer-readable storage medium of claim 10, wherein the connection request is forwarded to the second computer, and the connection is established after receiving a reply from the second computer.

13. The non-transitory computer-readable storage medium of claim 9, wherein the first computer is protected by a firewall and the second computer is outside of the firewall.

14. The non-transitory computer-readable storage medium of claim 9, wherein the first computer is outside of a firewall and the second computer is protected by the firewall.

15. A data processing system for protocol detection in a network proxy, the network proxy including a plurality of application proxies, the data processing system comprising:
 a memory having stored thereon instructions; and
 a processor executing the instructions, the instructions including instructions for:
  receiving from a first computer a request for connection to a second computer,
  establishing a connection with at least one of the first computer and the second computer according to a connection establishment routine,
  receiving application data from at least one of the first computer and the second computer, wherein the application data conforms to an application protocol,
  prior to forwarding the application data between the first and second computers, determining the application protocol by comparing the received application data to protocol signatures and, according to results of the comparison, determining whether or not the application protocol corresponds to any one of the plurality of application proxies in the network proxy; and
 if the application protocol, as determined by comparing the received application data to protocol signatures, corresponds to one of the application proxies in the network proxy, then responsively handing off the connection to the one application proxy corresponding to the application protocol, and
 if the application protocol, as determined by comparing the received application data to protocol signatures, does not correspond to any one of the plurality of application proxies in the network proxy, then responsively handling the connection according to a predetermined policy that is one of (i) allowing the connection, (ii) allowing the connection to be subject to protocol optimization, and (iii) allowing the connection subject to at least bandwidth limitation, bandwidth prioritization, or bandwidth optimization,
 wherein a first set of protocol signatures is employed for analyzing application data received from the first computer and a second set of protocol signatures, different from the first set, is employed for analyzing application data received from the second computer.

* * * * *